United States Patent [19]

Hibberd

[11] Patent Number: 5,622,446

[45] Date of Patent: Apr. 22, 1997

[54] LOCKABLE TELESCOPING MEMBERS

[75] Inventor: George H. Hibberd, Sheffield, England

[73] Assignee: James Neill Holdings Limited, Sheffield, England

[21] Appl. No.: 499,105

[22] Filed: Jul. 6, 1995

[30] Foreign Application Priority Data

Jul. 7, 1994 [GB] United Kingdom .................. 9413689

[51] Int. Cl.6 ................................ B25G 3/00; F16B 7/10
[52] U.S. Cl. ........................ 403/377; 403/109; 403/351; 403/367; 403/409.1
[58] Field of Search ..................................... 403/109, 351, 403/352, 350, 365, 367, 372, 377, 409.1, DIG. 8

[56] References Cited

U.S. PATENT DOCUMENTS

| | | | |
|---|---|---|---|
| 2,165,967 | 7/1939 | Haupt | 403/109 X |
| 4,076,437 | 2/1978 | Mazzolla | 403/109 X |
| 4,299,421 | 11/1981 | Bontrager | 403/109 X |
| 5,011,319 | 4/1991 | Levi et al. | 403/351 |

FOREIGN PATENT DOCUMENTS

| | | | |
|---|---|---|---|
| 3033398 | 4/1982 | Germany . | |
| 1338255 | 8/1970 | United Kingdom | 403/350 |
| 1270242 | 4/1972 | United Kingdom . | |
| 2060108 | 4/1981 | United Kingdom . | |
| 2071194 | 9/1981 | United Kingdom . | |

Primary Examiner—Blair Johnson
Assistant Examiner—Bruce A. Lev
Attorney, Agent, or Firm—Trexler, Bushnell, Giangiorgi & Blackstone, Ltd.

[57] ABSTRACT

Lockable telescopic members are known that employ separate compression fittings or spring clips, and which can with advantage be avoided. Twist locks are also known where the members can be over rotated to release the connection and cause damage to the members. The objectives of the present invention are to avoid these disadvantages, which objectives are met by a construction comprising an outer tube of generally oval cross-section, an inner member able to be slidably and rotatably located within the outer tube, and a locking member located on the inner member, said locking member having opposed, curved lobes on radii struck from spaced centres to provide a distance between dead centre positions of each lobe less than a major axis of the generally oval outer tube and greater than a minor axis of the provide a minor axial width of the lobe less than a minor axial dimension of the outer tube, the peripheral extent of each lobe being such that outer extremities of the lobes lie in close, but spaced, relationship to an inner surface of the outer tube when the axial line between the respective dead centres of each lobe is in alignment with the major axis of the outer tube, a connecting surface between extremities of the lobe to each side of the member being indented, to ensure that the sides of the member do not foul on the inner surface of the outer tube, and there being a sleeve provided having an oval outer profile to match that of the outer tube and having a circular bore corresponding to the outer diameter of the circular inner member, and whereby the sleeve is a push fit in one end of the outer tube and the inner member is a sliding fit in the sleeve.

1 Claim, 2 Drawing Sheets

LOCKABLE TELESCOPING MEMBERS

This invention relates to locking means and is particularly concerned with the locking of telescopic members in required axial dispositions.

There are numerous arts where telescopic members are required and where easy adjustment of the combined length of the telescopic members, and security of connection between the members at a required length are important requirements. This applies particularly to hand tools for garden use where an ability to extend the length of the handle of a particular garden tool can be of considerable benefit in allowing the user to reach otherwise difficult to access areas with the operative end of the hand tool, and equally beneficial to the elderly or infirm who find bending or kneeling to enable the use of a garden tool with a short handle, extremely difficult.

In addition to hand tools for garden use, there are other areas, such as various sports, where a sporting article can most beneficially have a facility for extending its length and where, again, ease of adjustment and security of connection are most important. Thus, and for example, there are such as snooker cues and rests, and in fishing such as landing nets where an ability to adjust the length to greater than normal, can be most beneficial.

There are considerable disclosures in the prior art of locking means to secure telescopic members at a required length. Predominantly, such locking means have involved the use of separate compression fittings or spring clip means to hold one member in fixed axial relationship to the other. Such constructions are prone to both wear and damage, and have relatively short lives. Equally, and with some known locking members, it is possible for a sufficient rotational force to be applied to cause the locking member to rotate to beyond its dead centre, or locking position, thereby releasing the connection between the two members and with the potential to damage either or both of the members.

The object of the invention is to provide a locking means that enables the two primary requirements of ease of use and security of fixing to be met, and which avoids those disadvantages mentioned above.

According to the present invention, a locking means for telescopic members comprises an outer tube of generally oval cross-section, an inner member able to be slidably and rotatably located within the outer tube, and a locking member located on the inner member, said locking member having opposed, curved lobes on radii struck from spaced centres to provide a distance between dead centre positions of each lobe less than the major axis of the generally oval outer tube and greater than the minor axis of the generally oval outer tube, and to provide a minor axial width of the lobe less than the minor axial dimension of the outer tube, the peripheral extent of each lobe being such that the outer extremities of the lobes lie in close, but spaced, relationship to the inner surface of the outer tube when the axial line between the respective dead centres of each lobe is in alignment with the major axis of the outer tube. Desirably, the connecting surface between the extremities of the lobe to each side of the member are relieved, e.g. of concave configuration, to ensure that the sides of the member do not foul on the inner surface of the outer tube.

Thus, with the locking member positioned to align the axial line between the respective dead centres of its lobes, the inner member can slide with complete freedom within the outer member, enabling the two members to be positioned to provide a required combined length. Once in this position, a marginal relative opposite rotation between the outer and inner members brings the lobes into contact with the inner surface of the outer tube to opposite sides of their dead centre points where the diametral distance across the outer tube is equal to the axial distance between the lobe surfaces. Having reached that point, a force attempting to continue relative rotation between the inner and outer member causes the lobed locking member to jam across the generally oval outer tube and to hold securely the outer tube and the inner member in their required positions.

By virtue of the nature of the lobed locking member, and the relatively small permitted rotational movement between the inner member and the outer tube before jamming of the lobed member across the outer tube takes place, it is impossible for the inner member, and hence the lobed locking member, to be rotated to and beyond 90° from the position of the lobed member enabling the inner member to slide within the outer member, to break the locking connection between the inner and outer members and with consequent potentially irreparable damage of the outer tube and/or the locking member.

One embodiment of the invention will now be described by way of example only with reference to the accompanying drawings in which.

Figure 1:
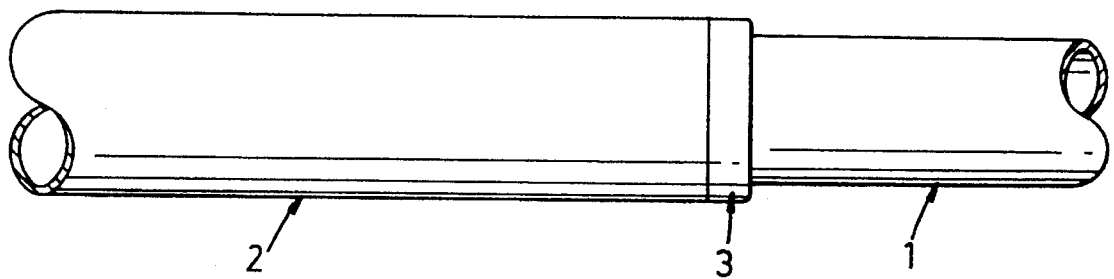
FIG. 1 is a side elevation of telescopic members provided with the locking means of the invention.
Figure 2:
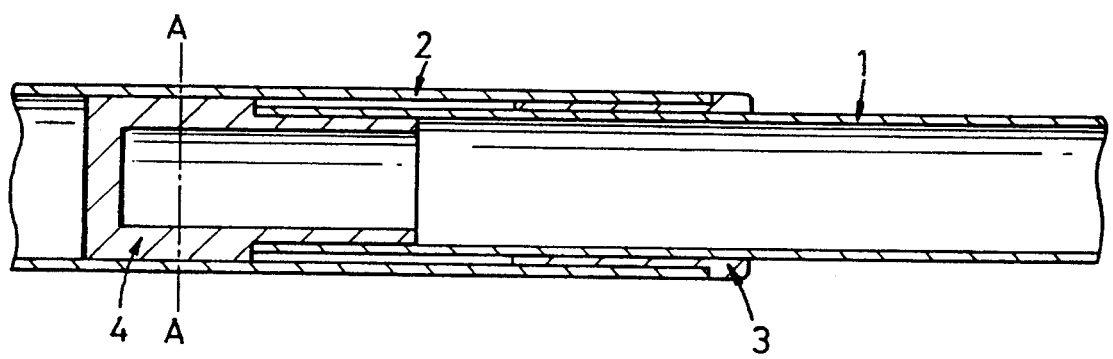
FIG. 2 is a sectional side elevation of the telescopic members of FIG. 1.
Figure 3:
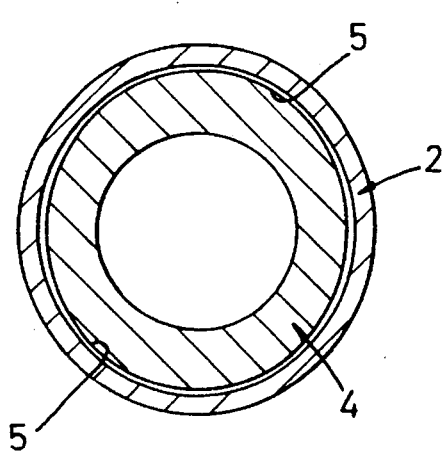
FIGS. 3 and 4 are sections on the line A—A of FIG. 2 showing the locking means in an inoperative and in an operative position respectively.
Figure 4:
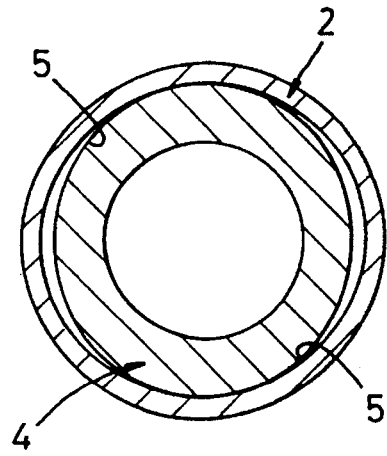

As is shown in the drawings, telescopic tubes 1,2 are provided of which the telescopic tube 1 constitutes an inner tube and is of circular cross-section and tube 2 constitutes an outer tube and is of oval cross-section, there being a sleeve 3 externally of oval cross-section and with major and minor axes corresponding to those of the outer tube and whereby the sleeve is a tight push fit in the outer tube. The sleeve has a circular bore in which the externally circular inner tube 1 is a sliding fit.

On the end of the inner tube within the outer tube is a locking member 4, which has a generally oval cross-section with major and minor axes which, when in alignment with major and minor axes of the outer tube, permit the locking member to slide relatively freely within the outer tube, the arrangement being such that when the locking member is rotated about its longitudinal axis, its outer surface is brought into contact with the inner face of the oval outer tube, allowing the locking member to be locked against a relative lengthwise movement along the outer tube, whereby to allow the inner tube to be brought to a required relative position with respect to the outer tube and then locked against further movement, the two tubes combining to provide a required aggregate tube length.

It is essential to prevent a relative rotation of the inner tube and the locking member in relation to the outer tube that would take the top and bottom dead centres of the locking member to beyond the minor axis and when the locking means would again reach a position where the inner tube would be free to move.

Figure 5:
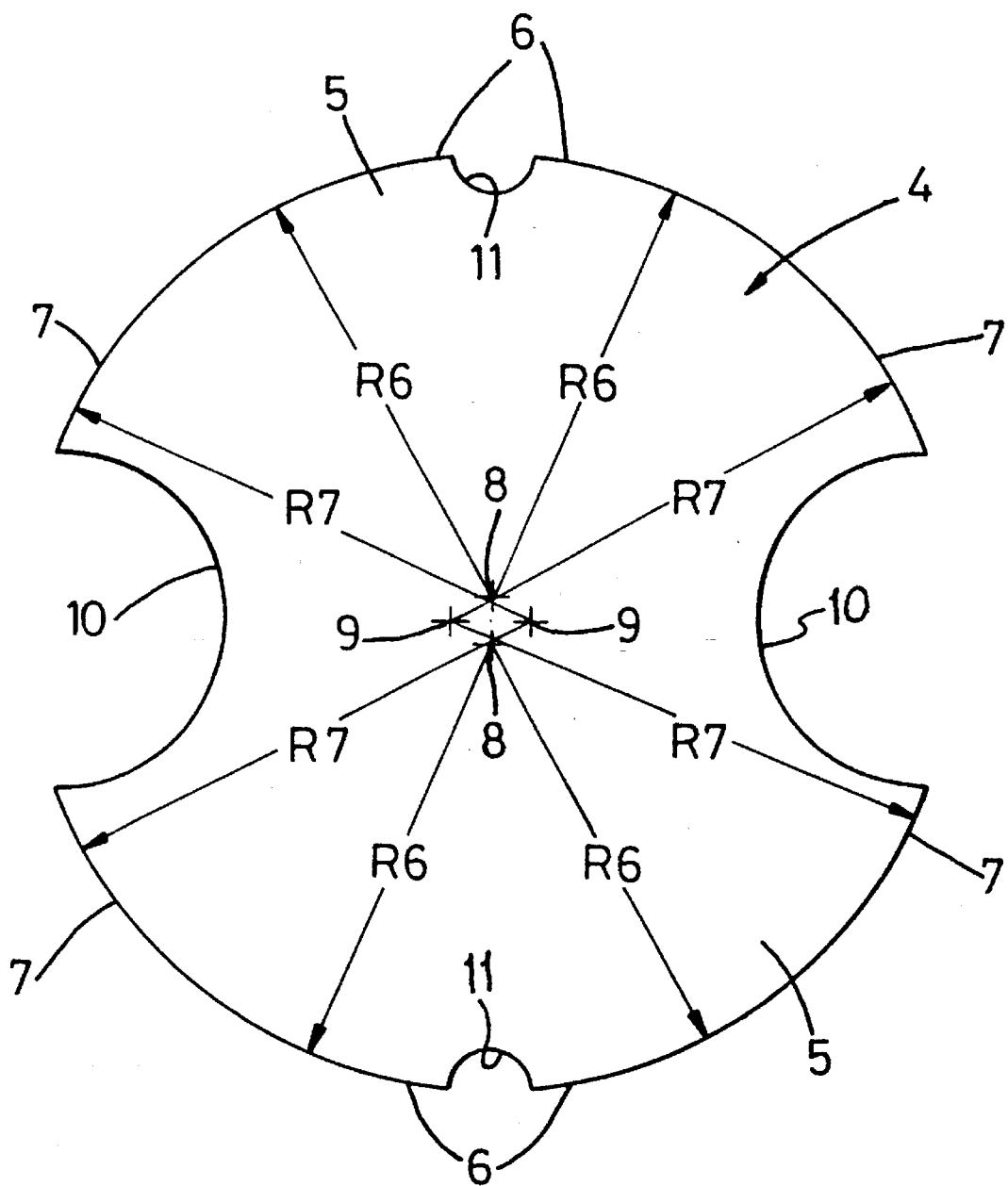
FIG. 5 is an enlarged end elevation of the locking member of the invention.

Therefore, and as is shown particularly by FIG. 5, the locking member has a lobed configuration, two lobes 5 being provided, each lobe having lobe sectors 6 of one radius R6 and the lobe sectors 7 of a larger radius R7 the radii being struck from different centres to result in lobes having the arcuate sectors 6 and 7 blending and such that a rotation of the locking member within the oval outer tube results in a jamming of the locking member by diametrically opposite arcuate sectors 6 against the inner wall of the outer tube with the effective prevention of the ability of the lobed locking member to be rotated to a degree sufficient to take the top and bottom dead centres of its major axis to and beyond the position of the minor axis of the outer tube. Once the lobes are in contact with the inner surface of the outer tube all that is required is a relatively low rotational force to cause jamming and a relatively low rotational force in the opposite direction to unlock the locking mechanism and permit an adjustment of the position of the inner tube in relation to the outer tube.

Thus as is shown by FIG. 5, the lobe sectors 6 to each side of the top and bottom dead centre of the major axis of the lobed member are respectively struck from centres 8, to either side of the true centre, and the lobe sectors 7 to either side of the minor axis of the lobed member are respectively struck from centres 9 again to either side of the true centre.

To facilitate the unhindered sliding of the inner tube within the outer tube, it is preferred, as shown, in FIG. 5 to provide relieve at the top and bottom dead centres and at the mid point of each side by forming longitudinal extending indentations 10,11 on the outer surface of the locking member.

I claim:

1. Lockable telescopic members comprising an outer tube of generally oval cross-section, a circular inner member able to be slidably and rotatably located within the outer tube, and a locking member located on the inner member, said locking member having opposed, curved lobes on radii struck from spaced centres to provide a distance between dead centre positions of each lobe less than a major axis of the outer tube and greater than a minor axis of the outer tube, and to provide a minor axial width of the lobe less than a minor axial dimension of the outer tube, the peripheral extent of each lobe being such that outer extremities of the lobes lie in close, but spaced, relationship to an inner surface of the outer tube when the axial line between the respective dead centres of each lobe is in alignment with the major axis of the outer tube, a connecting surface between extremities of the lobe to each side of the member being indented, to ensure that the sides of the member do not foul on the inner surface of the outer tube, and there being a sleeve provided having an oval outer profile to match that of the outer tube and having a circular bore corresponding to the outer diameter of the circular inner member, and whereby the sleeve is a push fit in one end of the outer tube and the inner member is a sliding fit in the sleeve.

\* \* \* \* \*